United States Patent
Jia et al.

(10) Patent No.: US 11,252,017 B2
(45) Date of Patent: Feb. 15, 2022

(54) FACILITATING MANAGEMENT OF SECONDARY CELL GROUP FAILURES IN FIFTH GENERATION (5G) OR OTHER ADVANCED NETWORKS

(71) Applicant: AT&T Intellectual Property I, L.P., Atlanta, GA (US)

(72) Inventors: Yupeng Jia, Austin, TX (US); Milap Majmundar, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 4 days.

(21) Appl. No.: 16/518,949

(22) Filed: Jul. 22, 2019

(65) Prior Publication Data

US 2021/0028976 A1    Jan. 28, 2021

(51) Int. Cl.
*H04L 12/24* (2006.01)
*H04L 12/26* (2006.01)
*H04W 76/15* (2018.01)
*H04W 36/00* (2009.01)
*H04W 36/30* (2009.01)
*H04W 76/19* (2018.01)
*H04L 5/00* (2006.01)

(52) U.S. Cl.
CPC ...... *H04L 41/0654* (2013.01); *H04L 41/0816* (2013.01); *H04L 43/16* (2013.01)

(58) Field of Classification Search
CPC .. H04L 41/0654; H04L 41/0816; H04L 43/16
USPC ........................................................ 370/217
See application file for complete search history.

(56) References Cited

U.S. PATENT DOCUMENTS

| | | | |
|---|---|---|---|
| 2016/0219603 A1* | 7/2016 | Fujishiro | H04W 36/08 |
| 2018/0278357 A1* | 9/2018 | Kim | H04J 11/0076 |
| 2019/0081691 A1* | 3/2019 | Nagaraja | H04W 56/0005 |
| 2019/0089579 A1* | 3/2019 | Sang | H04W 76/27 |
| 2019/0215756 A1* | 7/2019 | Park | H04W 52/06 |
| 2019/0215820 A1* | 7/2019 | Cirik | H04W 72/0446 |
| 2020/0045594 A1* | 2/2020 | Peng | H04W 36/0072 |
| 2020/0059985 A1* | 2/2020 | Henttonen | H04W 76/11 |
| 2020/0267777 A1* | 8/2020 | Dinan | H04W 72/0406 |
| 2020/0374960 A1* | 11/2020 | Deenoo | H04W 72/14 |

OTHER PUBLICATIONS

3GPP, "3rd Generation Partnership Project Technical Specification Group Radio Access Network-Evolved Universal Terrestrial Radio Access (E-UTRA)-Evolved Universal Terrestrial Radio Access (E-UTRA)-Protocol specification", TS 36.331, Jun. 2018, 791 pages.

* cited by examiner

*Primary Examiner* — Kwang B Yao
*Assistant Examiner* — Xuan Lu
(74) *Attorney, Agent, or Firm* — Amin, Turocy & Watson, LLP

(57) ABSTRACT

Facilitating management of secondary cell group failures in advanced networks (e.g., 5G and beyond) is provided herein. Operations of a method can comprise determining, by a system comprising a processor, that a first secondary cell group procedure attempt is unsuccessful. Further, the method can comprise facilitating, by the system, a second secondary cell group procedure attempt based on expiration of a delay timer and based on a determination that a retry attempt threshold level is not exceeded.

20 Claims, 10 Drawing Sheets

| Timer | Start | Stop | At expiry |
|---|---|---|---|
| T_SCG_addition_failure | Reception of *SgNBAdditionRequestReject* | Reception of SgNBAdditionRequestAcknowledge. Reset N_SCG_addition_failure retry counter | Increment N_SCG_addition_failure retry counter. If N_SGN_addition_failure retry counter value does not exceed its maximum value, initiate SgNBAdditionRequest. |
| T_SCG_RLF | Reception of SCGFailureInformationNR |  | Increment N_SGN_RLF retry counter. If N_SGN_RLF retry counter value does not exceed its maximum value, instruct UE to access SCG (gNB) |
| T_SCG_reconfiguration_failure | Reception of *SgNBModificationRequestReject* | Reception of SgNBModificationRequestAcknowledge. Reset N_SCG_reconfiguration_failure retry counter | Increment N_SCG_reconfiguration_failure retry counter. If N_SGN_reconfiguration_failure retry counter value does not exceed its maximum value, initiate SgNBModificationRequest |

| Counter | Reset | Incremented | When reaching max value |
|---|---|---|---|
| N_SCG_addition_failure | Reception of SgNBAdditionRequestAcknowledge | Upon expiry of T_SCG_addition_failure timer | Release SCG |
| N_SCG_RLF | Successful access to SCG (gNB) | Upon expiry of T_SCG_RLF timer | Release SCG |
| N_SCG_reconfiguration_failure | Reception of SgNBModificationRequestAcknowledge | Upon expiry of T_SCG_reconfiguration_failure timer | Release SCG |

814 — 816 — 818 — 820

FACILITATING MANAGEMENT OF SECONDARY CELL GROUP FAILURES IN FIFTH GENERATION (5G) OR OTHER ADVANCED NETWORKS

TECHNICAL FIELD

This disclosure relates generally to the field of network communicating and, more specifically, to secondary cell group failures in fifth generation (5G) or other advanced networks.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) for wireless communications. Unique challenges exist to provide levels of service associated with forthcoming 5G, and/or other next generation, standards for wireless communication.

BRIEF DESCRIPTION OF THE DRAWINGS

Various non-limiting embodiments are further described with reference to the accompanying drawings in which:

FIG. 8A illustrates first table for the implementation of timers in a standards document in accordance with one or more embodiments described herein;

FIG. 8B illustrates a second table for the implementation of counters in a standards document in accordance with one or more embodiments described herein;

DETAILED DESCRIPTION

Figure 1:
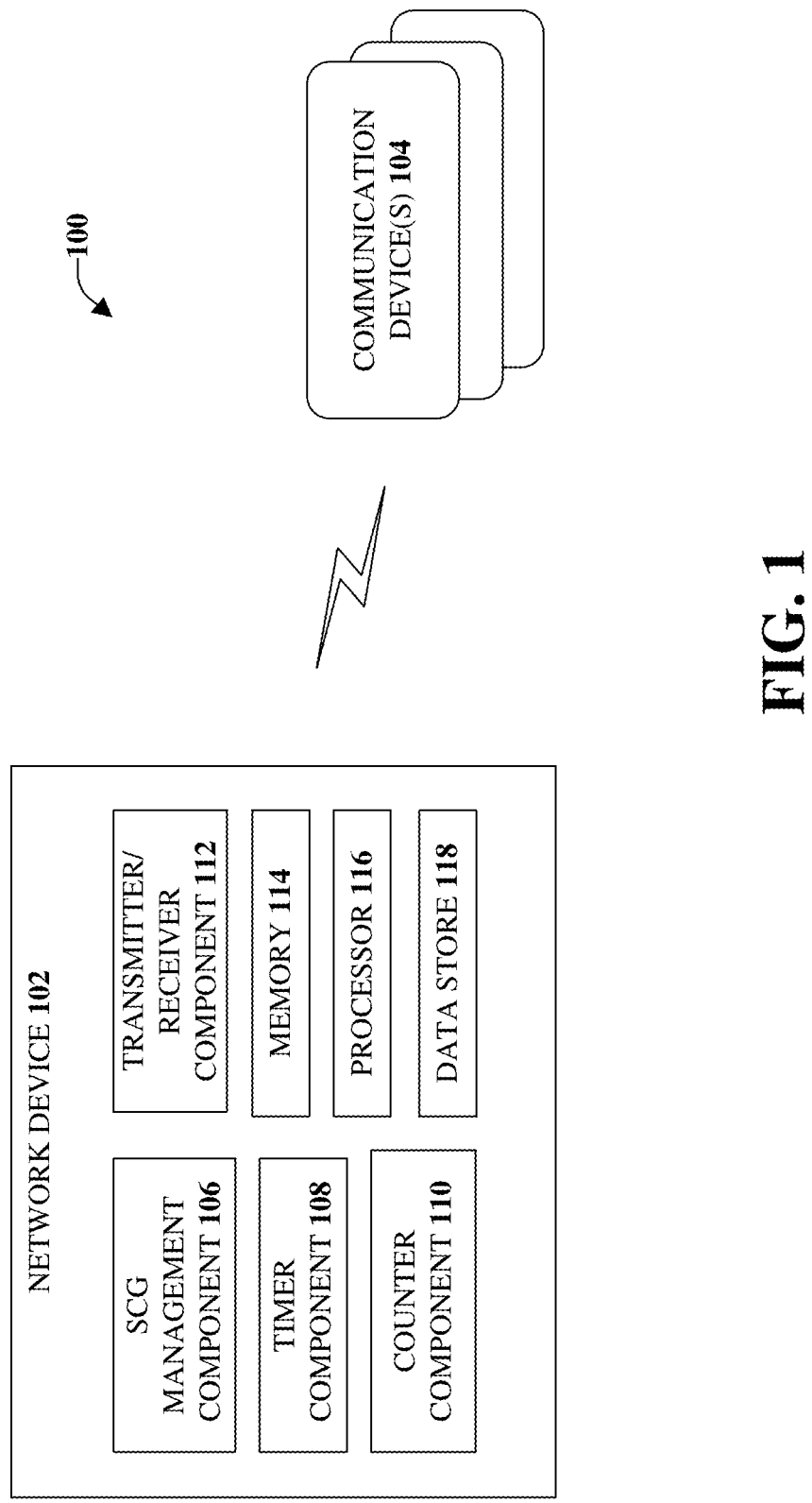
FIG. 1 illustrates an example, non-limiting, system for facilitating management of secondary cell group failures in advanced networks in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate management of secondary cell group failures in advanced networks. The disclosed aspects can be applied to Non-Stand Alone (NSA) network deployments or to Stand Alone (SA) network deployments. For the SA deployment, the master cell would be a NR cell and in the NSA deployment, the master cell would be an LTE cell. Further, although various aspects are discussed with respect to a 5G deployment, the disclosed aspects can be applied to other types of deployment or wireless standard.

In an example, in early 5G deployment, Long-Term Evolution (LTE)-5G dual connectivity allowed operators to leverage the LTE network coverage and throughput for a better user experience. Generally speaking, an operator could use LTE to provide control channel information while using 5G New Radio (NR) and/or LTE for the data traffic (e.g., NSA network architecture option 3x.)

For NSA option 3x, the Secondary Cell Group (SCG) addition/modification/release is initiated by master cell group (MCG, LTE eNB for 3x) and the SCG modification/release can be initiated by either an MCG or SCG node. For a SA network architecture, the master cell would be an NR cell.

In the different network architectures, various SCG failures can occur. Such failures can include SCG addition failure, SCG Radio Link Failure (RLF), and SCG change/configuration failure. The various embodiments provided herein can facilitate mechanisms to allow for management of the various SCG failure scenarios.

According to an embodiment, provided is a device that can comprise a processor and a memory that stores executable instructions that, when executed by the processor, facilitate performance of operations. The operations can comprise initiating a first timer based on a detection of a secondary cell group failure message received in response to a first secondary cell group function. The operations also can comprise determining whether a retry attempt threshold level has been satisfied. Further, the operations can comprise facilitating a second secondary cell group function based on an expiration of the first timer and based on the determination indicating that the retry attempt threshold level has not been satisfied. The device can be deployed in a non-standalone deployment architecture. Alternatively, the device can be deployed in a standalone deployment architecture.

According to an implementation, the first secondary cell group function and the second secondary cell group function can be secondary cell group addition functions. Further to this implementation, the first timer can be a secondary cell group addition failure timer and determining whether the retry attempt threshold level has been satisfied can be based on a value associated with a defined secondary cell group addition failure retry counter.

In accordance with another implementation, the first secondary cell group function and the second secondary cell group function can be secondary cell group reconfiguration functions. Further to this implementation, the first timer can be a secondary cell group reconfiguration failure timer and determining whether the retry attempt threshold level has been satisfied can be based on a value associated with a defined secondary cell group reconfiguration failure retry counter.

According to some implementations, the first secondary cell group function and the second secondary cell group function can be secondary cell group radio link functions. Further to these implementations, the first timer can be a secondary cell group radio link failure timer, and determining whether the retry attempt threshold level has been satisfied can be based on a value associated with a defined secondary cell group radio link failure retry counter.

In some implementations, prior to initiating the first timer, the operations can comprise determining whether attempts for subsequent secondary cell group functions are to be attempted based on receipt of the secondary cell group failure indication. Alternatively, or additionally, in some implementations, the operations can comprise terminating subsequent retry attempts based on the determination indicating that the retry attempt threshold level has been satisfied.

Another embodiment can relate to a method that can comprise determining, by a system comprising a processor, that a first secondary cell group procedure attempt is unsuccessful. Further, the method can comprise facilitating, by the system, a second secondary cell group procedure attempt based on expiration of a delay timer and based on a determination that a retry attempt threshold level is not exceeded.

According to some implementations, the determination is a first determination, the delay timer is a first delay timer, and the expiration is a first expiration. Further to these implementations, the method can comprise determining, by the system, that the second secondary cell group procedure attempt is unsuccessful. The method also can comprise facilitating, by the system, a third secondary cell group procedure attempt based on a second expiration of a second delay timer and based on a second determination that the retry attempt threshold level is not exceeded.

In an example, the first secondary cell group procedure attempt and the second secondary cell group procedure attempt can be secondary cell group addition procedures. In another example, the first secondary cell group procedure attempt and the second secondary cell group procedure attempt can be secondary cell group reconfiguration procedures. According to yet another example, the first secondary cell group procedure attempt and the second secondary cell group procedure attempt can be secondary cell group radio link procedures.

Another embodiment can relate to a machine-readable storage medium, comprising executable instructions that, when executed by a processor, facilitate performance of operations. The operations can comprise determining, based on detection of a first secondary cell group procedure, that a second secondary cell group procedure is to be attempted. The operations also can comprise determining whether a number of attempts that have already been performed is less than a defined number of attempts. Further, the operations can comprise attempting the second secondary cell group procedure based on expiration of a timer and based on the determination indicating that the number of attempts is less than the defined number of attempts.

According to some implementations, the first secondary cell group procedure and the second secondary cell group procedure can be secondary cell group addition procedures. The timer can be a secondary cell group addition failure timer, and determining the number of attempts is less than the defined number of attempts can be based on a defined secondary cell group addition failure retry counter.

In some implementations, the first secondary cell group procedure and the second secondary cell group procedure can be secondary cell group reconfiguration procedures. The timer can be a secondary cell group reconfiguration failure timer, and determining the number of attempts is less than the defined number of attempts can be based on a defined secondary cell group reconfiguration failure retry counter.

Further, in some implementations, the first secondary cell group procedure and the second secondary cell group procedure can be secondary cell group radio link procedures. The timer can be a secondary cell group reconfiguration failure timer, and determining the number of attempts that have already been performed is less than the defined number of attempts can be based on a defined secondary cell group radio link failure retry counter.

With reference initially to FIG. 1, illustrated is an example, non-limiting, system 100 for facilitating management of secondary cell group failures in advanced networks in accordance with one or more embodiments described herein. Aspects of systems (e.g., the system 100 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 1, the system 100 can include a network device 102 and one or more communication devices 104. The network device 102 can be included in a group of network devices of a wireless network. Further, the network device 102 can be deployed in a non-standalone deployment architecture (e.g., a NSA wireless network). Alternatively, the network device 102 can be deployed in a standalone deployment architecture (e.g., a SA wireless network). Although only a single communication device and a single network device are shown and described, the various aspects are not limited to this implementation. Instead, multiple communication devices and/or multiple network devices can be included in a communications system.

The network device 102 can include a Secondary Cell Group (SCG) management component 106, a timer component 108, a counter component 110, a transmitter/receiver component 112, at least one memory 114, at least one processor 116, and at least one data store 118. The SCG management component 106 can facilitate one or more SCG functions. The facilitation of the one or more SCG functions by the SCG management component 106 can be facilitated through the transmitter/receiver component 112.

In some cases, a SCG failure can occur. For example, a first SCG function can be initiated by the network device 102 and, due to a failure, a response to the first SCG function can be a SCG failure notification, which can be received via the transmitter/receiver component 112.

Upon or after detection of the SCG failure, the timer component 108 can initiate a first timer (e.g., a first timer routine, a first timer tracking procedure, a first countdown, and so on). The first timer (and other timers) can be delay counters that provide additional time before a retry attempt is initiated. For example, in some circumstances, a failure can occur because the UE device may have moved sufficiently away from the cell or the link condition has deteriorated so much that the procedure cannot be completed. In some cases, there is no reason for the link to suddenly improve within a short period of time. Therefore, there is no reason to retry again in a short period of time. Further, when operating in millimeter (mm) wave spectrum, there is a phenomenon referred to as "blockage." For example, there is an object that comes between the communication device (e.g., a User Equipment (UE) device) and the network device. If that UE device is performing a procedure at the time the blockage occurs, the procedure could fail. In a few seconds it is possible that the blockage is removed, or the user themselves might block the beam. Therefore, the failure in the mm wave spectrum could be short in length (e.g., a short time duration). Therefore, there should be a slight delay (or a longer delay) before a retry attempt (or multiple retry attempts) are conducted and before terminating the SCG procedure.

During the time countdown, or after expiration of the first timer, the counter component 110 can determine whether a retry attempt threshold level has been satisfied. If the retry attempt threshold level has been satisfied, subsequent retry attempts can be terminated for the SCG group function under analysis.

Upon or after expiration of the first timer, and based on the determination by the counter component 110 that the retry attempt threshold level has not been satisfied, the SCG management component 106 can facilitate a second secondary cell group function.

In an example, the SCG management component 106 can facilitate (and/or can initiate) various procedures including, for example, an SCG addition, an SCG node configuration procedure, and an SCG node release procedure. The SCG cell addition can be initiated by the MCG node via NR (e.g., SA deployment) and can be used to establish a UE context at the SCG node to provide radio resources from the SCG node to the UE device. The SCG cell addition can be initiated by LTE (e.g., NSA deployment) or by NR (e.g., SA deployment).

The SCG node configuration procedure can be initiated either by the MCG node or by the SCG node and can be used to modify, establish, or release bearer contexts, to transfer bearer contexts to and/or from the SCG node, and/or to modify other properties of the UE context within the same SCG node. The SCG node configuration procedure could also be used to transfer an NR RRC message from the SCG node to the UE via the MCG node and the response from the UE via MCG node to the SCG node.

Further, the SCG Node Release procedure can be initiated either by the MCG node or by the SCG node and can be used to initiate the release of the UE context at the SCG node. The recipient node of this request can reject it (e.g., if a SCG node change procedure is triggered by the SCG node).

Various SCG failures can occur including, an SCG addition failure, an SCG configuration failure, and an SCG radio link failure (RLF). For example, the SCG addition failure indicates that NR cannot be added as the secondary cell. The SCG configuration failure can occur when the network configures, reconfigures, and/or changes the cell group and there is a failure. The SCG RLF can occur after already having an established SgNB and corresponding bearers. In an example, the SCG RLF could be caused by the RF conditions, or something else (e.g., the UE device is being moved to the edge, or out of, the NR coverage. When there is an SCG RLF, the SCG is released, and the UE sends a message to the RAN. In an example, the message could be an SCGFailureInformationNR message.

The current 3GPP standard does not specify how to handle the failure scenarios from either the network perspective or the device perspective. There could be at least two behaviors encountered without an agreed upon standard. A first behavior can be that after SCG failure, either MCG node or SCG node can keep trying to re-establish SCG node connection depending on it is failure type. A second behavior can be that, after an SCG failure, the SCG node connection is stopped unless the device is power cycled or the device moves out then back to the SCG cell.

As discussed herein, two pairs of timer-counter values are provided to resolve the above noted issues. Although various aspects are discussed with respect to various timer and/or counter names, such names are for purposes of describing the disclosed aspects. Thus, other names can be utilized for the timers and/or counters than those provided herein.

A first pair of timer-counter values can be a T_SCG_addition_failure timer and a N_SCG_addition_failure retry counter, which can be used for an SCG addition failure condition. It is noted that "T" represents time and "N" represents number. Further, a second pair of timer-counter values can be a T_SCG_reconfiguration_failure timer and a T_SCG_reconfiguration_failure counter, which can be used for a SCG reconfiguration failure condition. Another pair of timer-counter values can be a T_SCG_RLF timer and N_SCG_RLF retry counter for a SCG radio link failure (SCG-RLF) condition. However, as discussed herein, the timers and/or counters are not intended to be limited to this naming convention and other names can be utilized.

The transmitter/receiver component 112 can be configured to transmit to, and/or receive data from, the communication device 104, other network devices, and/or other communication devices. Through the transmitter/receiver component 112, the network device 102 can concurrently transmit and receive data, can transmit and receive data at different times, or combinations thereof. According to some implementations, the transmitter/receiver component 112 can facilitate communications between the network device 102 and the communication device 104.

The at least one memory 114 can be operatively connected to the at least one processor 116. The at least one memory 114 can store executable instructions that, when executed by the at least one processor 116 can facilitate performance of operations. Further, the at least one processor 116 can be utilized to execute computer executable components stored in the at least one memory 114.

For example, the at least one memory 114 can store protocols associated with facilitating management of secondary cell group failures in advanced networks as discussed herein. Further, the at least one memory 114 can facilitate action to control communication between the network device 102, the communication device 104, other network devices, and/or other communication devices such that the network device 102 can employ stored protocols and/or algorithms to achieve improved communications in a wireless network as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 116 can facilitate respective analysis of information related to facilitating management of secondary cell group failures in advanced networks. The at least one processor 116 can be a processor dedicated to analyzing and/or generating information received, a processor that controls one or more components of the network device 102, and/or a processor that both analyzes and generates information received and controls one or more components of the network device 102.

Further, the term network device (e.g., network node, network node device) is used herein to refer to any type of network node serving communication devices and/or connected to other network nodes, network elements, or another network node from which the communication devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 102) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

Figure 2:
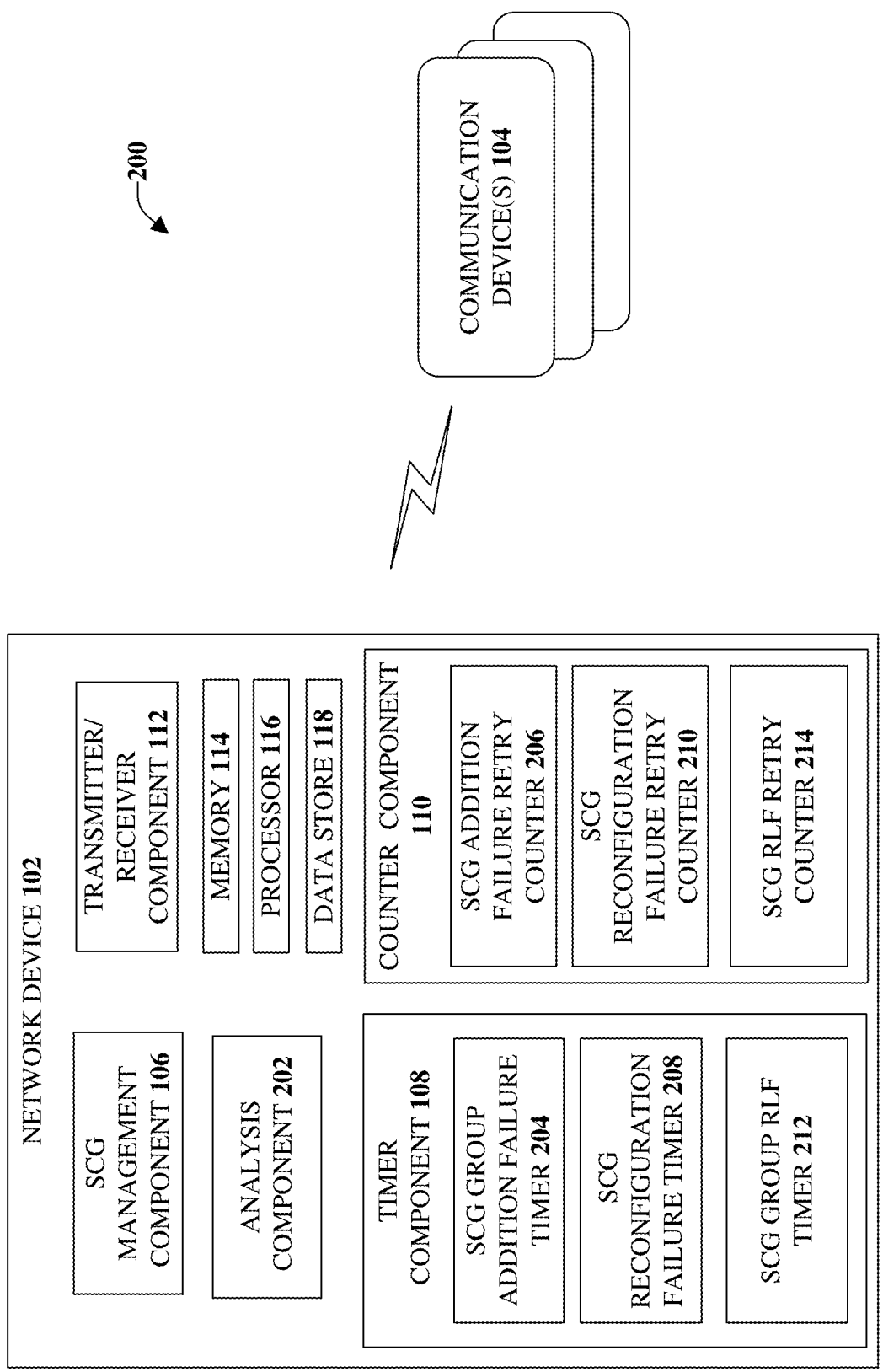
FIG. 2 illustrates an example, non-limiting system that selectively implements one or more secondary cell group reattempt procedures based on a failure type in accordance with one or more embodiments described herein.

FIG. 2 illustrates an example, non-limiting, system 200 that selectively implements one or more secondary cell group reattempt procedures based on a failure type in accordance with one or more embodiments described herein. Repetitive description of like elements employed in other embodiments described herein is omitted for sake of brevity. The system 200 can comprise one or more of the components and/or functionality of the system 100, and vice versa.

As illustrated, the network device 102 can comprise an analysis component 202 that can determine whether attempts for subsequent secondary cell group functions are to be attempted based on receipt of a secondary cell group failure. In some implementations, upon or after receipt of the notification of the first secondary cell group failure, the analysis component 202 can determine whether retry attempts should be made.

For example, upon or after detection of a SCG failure, and prior to initiating the procedure (e.g., timers and/or counters) as discussed herein, it is possible that the network device 102 might not want to implement the procedure. Thus, if the network device 102 already has some additional information about the conditions, which indicate that there is no reason to go ahead and conduct reattempt procedures, then the analysis component 202 might decide not to perform the procedure(s) discussed herein. Further, the analysis component 202 could learn, or infer, when to implement the procedure and when not to implement the procedure. For example, if the UE device is out of NR coverage (e.g., in a vehicle that is moving fast), there is no reason to reimplement the procedure (e.g., perform a retry attempt). Accordingly, the network device 102 (e.g., the analysis component 202) could decide to initiate (or not initiate) the procedure based on one or more conditions. The conditions could be conditions related to the UE device that may be known to the network device 102, a condition that is data mined based on a machine learning and reasoning algorithm, taking into account failures, network factors, and/or UE factors. This can include information directly known by, or learned by, the network device 102.

If the determination by the analysis component 202 is that attempts for subsequent secondary cell group functions are to be attempted, the timer component 108 can initiate a delay function such that a retry attempt is not conducted for a defined amount of time. The defined amount of time can be a default value and/or can include a series of numbers (e.g., 5, 10, 12, 17, and so on). In some implementations, the defined amount of time can be a matter of design choice. Further, the defined amount of time can be configurable and can change depending on various considerations (e.g., the type of failure, historical network information related to timing of failures, and so on).

According to some implementations, the SCG function initiated by the SCG management component 106 can be a secondary cell group addition function. Further to this example, the timer component 108 can initialize a secondary cell group addition failure timer 204. Further, the counter component 110 can determine whether the retry attempt threshold level has been satisfied based on a value associated with a secondary cell group addition failure retry counter 206.

In other implementations, the SCG function initiated by the SCG management component 106 can be a secondary cell group reconfiguration function. Further to these implementations, the timer component 108 can initialize a reconfiguration failure timer 208. In addition, the counter component 110 can determine whether the retry attempt threshold level has been satisfied based on a value associated with a secondary cell group reconfiguration failure retry counter 210.

In additional, or alternative, implementations, the SCG function initiated by the SCG management component 106 can be a secondary cell group radio link function. Further to these implementations, the timer component 108 can initialize a secondary cell group RLF timer 212. Additionally, the counter component 110 can determine whether the retry attempt threshold level has been satisfied is based on a value associated with a secondary cell group RLF retry counter 214.

If the counter component 110 (e.g., the secondary cell group addition failure retry counter 206, the secondary cell group reconfiguration failure retry counter 210, the secondary cell group RLF retry counter 214) determines the number of attempts that have already been performed has been satisfied, subsequent retry attempts are discontinued (e.g., no more attempts are made for a current SCG function).

Figure 3:
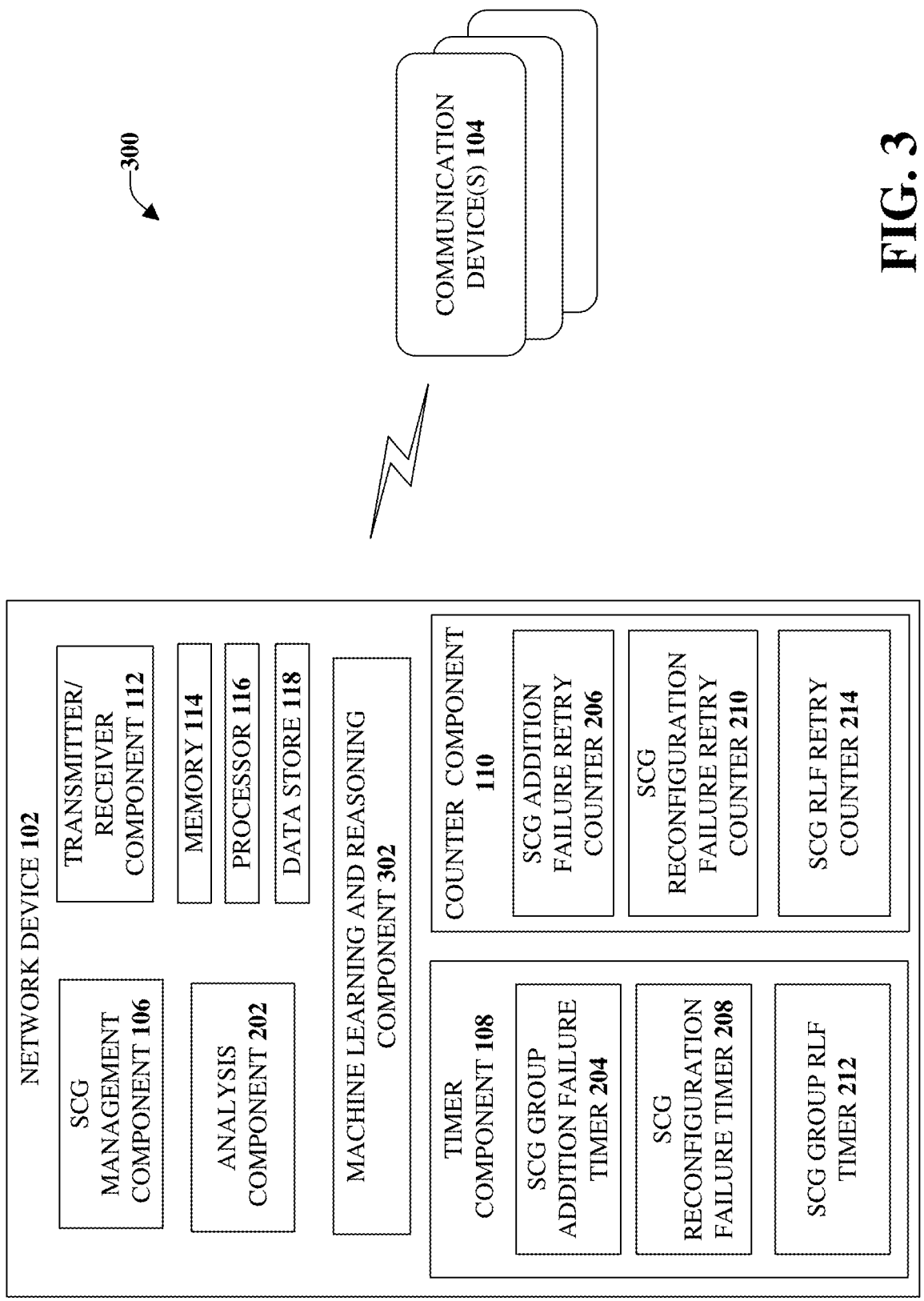
FIG. 3 illustrates an example, non-limiting, system that employs automated learning to facilitate one or more of the disclosed aspects in accordance with one or more embodiments described herein.

FIG. 3 illustrates an example, non-limiting, system 300 that employs automated learning to facilitate one or more of the disclosed aspects in accordance with one or more embodiments described herein. Repetitive description of like elements employed in other embodiments described herein is omitted for sake of brevity. The system 300 can comprise one or more of the components and/or functionality of the system 100, the system 200, and vice versa.

As illustrated, the network device 102 can comprise a machine learning and reasoning component 302 that can be utilized to automate one or more of the disclosed aspects. The machine learning and reasoning component 302 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 302 can employ principles of probabilistic and decision theoretic inference. Additionally, or alternatively, the machine learning and reasoning component 302 can rely on predictive models constructed using machine learning and/or automated learning procedures. Logic-centric inference can also be employed separately or in conjunction with probabilistic methods.

The machine learning and reasoning component 302 can infer a type of SCG failure and/or whether retry attempts should be conducted by obtaining knowledge about the network conditions, configurations of the network device 102 and/or communication device 104, and so on. Based on this knowledge, the machine learning and reasoning component 302 can make an inference based on which timer to implement, the length of the timer (e.g., the length of delay between retry attempts), the number of retry attempts that should be tried, which counter to implement, whether to change the time and/or number of attempts, or combinations thereof.

As used herein, the term "inference" refers generally to the process of reasoning about or inferring states of a system, a component, a module, an environment, and/or devices from a set of observations as captured through events, reports, data, and/or through other forms of communication. Inference can be employed to identify a specific SCG procedure or function implemented (or attempted to be implemented), or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with facilitating management of secondary cell group failures, and so forth) can employ various artificial intelligence-based schemes for carrying out various aspects thereof. For example, a process for determining if a particular SCG function, which was not successful, is to be retried, the number of retry attempts, the delay between attempts, and so on can be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification can employ a probabilistic and/or statistical-based analysis (e.g., factoring into the analysis utilities and costs) to provide a prognosis and/or infer one or more actions that should be employed to determine what a user desires to be automatically performed.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing network behavior, by receiving extrinsic information, and so on). For example, SVMs can be configured through a learning or training phase within a classifier constructor and feature selection module. Thus, a classifier(s) can be used to automatically learn and perform a number of functions, including but not limited to determining, according to a predetermined criterion, when to implement a retry attempt, which SCG procedure to implement, an amount of time that should elapse before another retry attempt is made, and so forth. The criteria can include, but is not limited to, similar requests, historical information, and so forth.

Additionally, or alternatively, an implementation scheme (e.g., a rule, a policy, and so on) can be applied to control and/or regulate SCG procedures and associated retry attempts. In some implementations, based upon a predefined criterion, the rules-based implementation can automatically and/or dynamically implement a SCG retry attempt procedure. In response thereto, the rule-based implementation can automatically interpret and carry out functions associated with the SCG retry attempt procedure by employing a predefined and/or programmed rule(s) based upon any desired criteria.

Methods that can be implemented in accordance with the disclosed subject matter, will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 4:
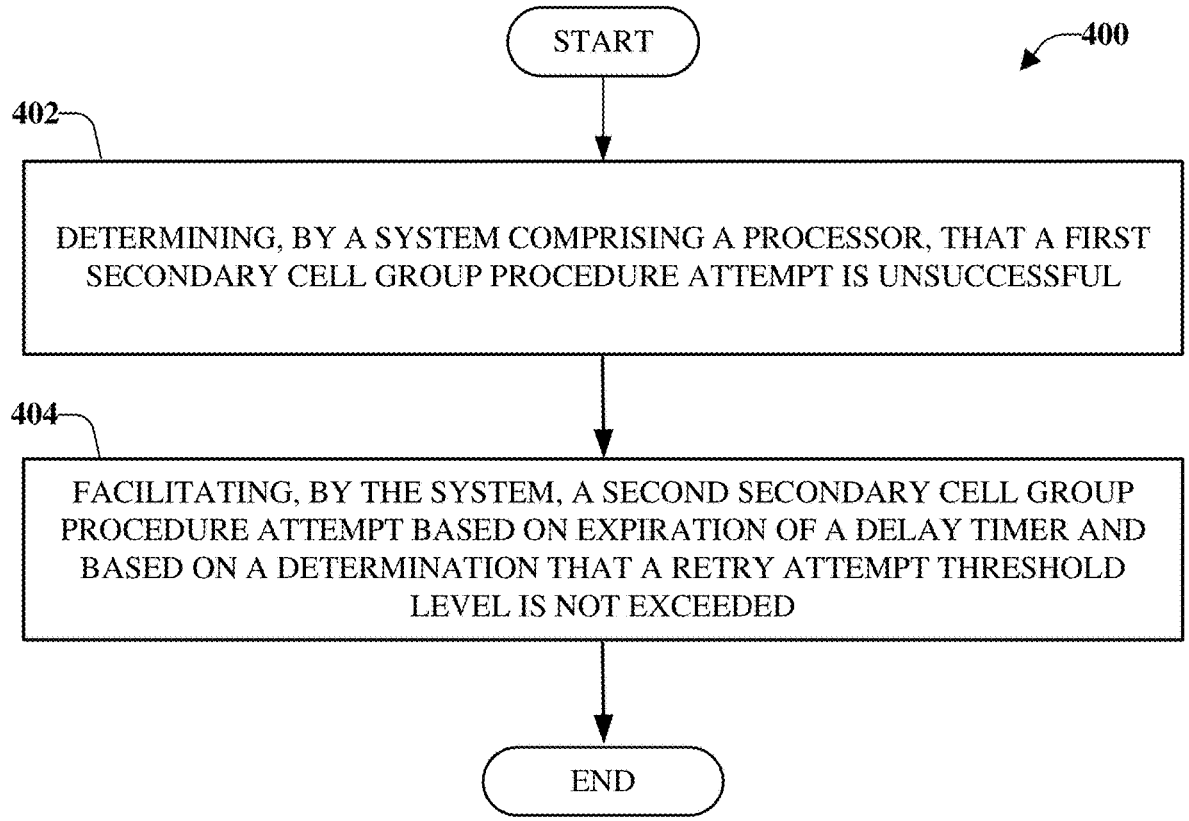
FIG. 4 illustrates a flow diagram of an example, non-limiting, computer-implemented method for facilitating management of secondary cell group failures in advanced networks in accordance with one or more embodiments described herein.

FIG. 4 illustrates a flow diagram of an example, non-limiting, computer-implemented method 400 for facilitating management of secondary cell group failures in advanced networks in accordance with one or more embodiments described herein. Repetitive description of like elements employed in other embodiments described herein is omitted for sake of brevity.

In some implementations, a system comprising a processor can perform the computer-implemented method 400 and/or other methods discussed herein. In other implementations, a device comprising a processor can perform the computer-implemented method 400 and/or other methods discussed herein. In other implementations, a machine-readable storage medium, can comprise executable instructions that, when executed by a processor, facilitate performance of operations, which can be the operations discussed with respect to the computer-implemented method 400 and/or other methods discussed herein. In further implementations, a computer readable storage device comprising executable instructions that, in response to execution, cause a system comprising a processor to perform operations, which can be operations discussed with respect to the computer-implemented method 400 and/or other methods discussed herein.

At 402 of the computer-implemented method 400, a system comprising a processor can determine that a first secondary cell group procedure attempt is unsuccessful (e.g., via the SCG management component 106). Further, at 404 of the computer-implemented method 400, the system can facilitate a second secondary cell group procedure attempt based on expiration of a delay timer and based on a determination that a retry attempt threshold level is not exceeded (e.g., via the SCG management component 106).

According to some implementations, the method can comprise, prior to facilitating the second secondary cell group procedure attempt, determining whether attempts for subsequent SCG functions are to be attempted.

In an example, the first secondary cell group procedure attempt and the second secondary cell group procedure attempt can be secondary cell group addition procedures. Further to this example, the delay timer can be facilitated by a secondary cell group addition failure timer (e.g., the secondary cell group addition failure timer 204). The retry attempt threshold level can be facilitated by a defined secondary cell group addition failure retry counter (e.g., the secondary cell group addition failure retry counter 206).

According to another example, the first secondary cell group function and the second secondary cell group function can be secondary cell group reconfiguration procedures. Further, to this example, the delay timer can be facilitated by a secondary cell group reconfiguration failure timer (e.g., the secondary cell group reconfiguration failure timer 208). In addition, the retry attempt threshold level can be a defined secondary cell group reconfiguration failure retry counter (e.g., the secondary cell group reconfiguration failure retry counter 210).

In accordance with another example, the first secondary cell group function and the second secondary cell group function can be secondary cell group radio link functions. The delay timer can be facilitated by a secondary cell group reconfiguration failure timer (e.g., the secondary cell group RLF timer 212). Further, the retry attempt threshold level can be facilitated by a secondary cell group radio link failure retry counter (e.g., the secondary cell group RLF retry counter 214).

According to some implementations, subsequent retry attempts can be attempted. For example, the second SCG procedure attempt could be unsuccessful. Thus, if the value of the counter has not been met or exceeded, another SCG procedure attempt can be implemented, after expiration of the delay timer.

It is to be understood that implementation of an SCG procedure attempt can be recursive such that any number of SCG procedure attempts can be conducted until the value of the counter has been met or exceeded. Further, the SCG procedure attempts can be performed until successful (and prior to the counter value being satisfied).

Figure 5:
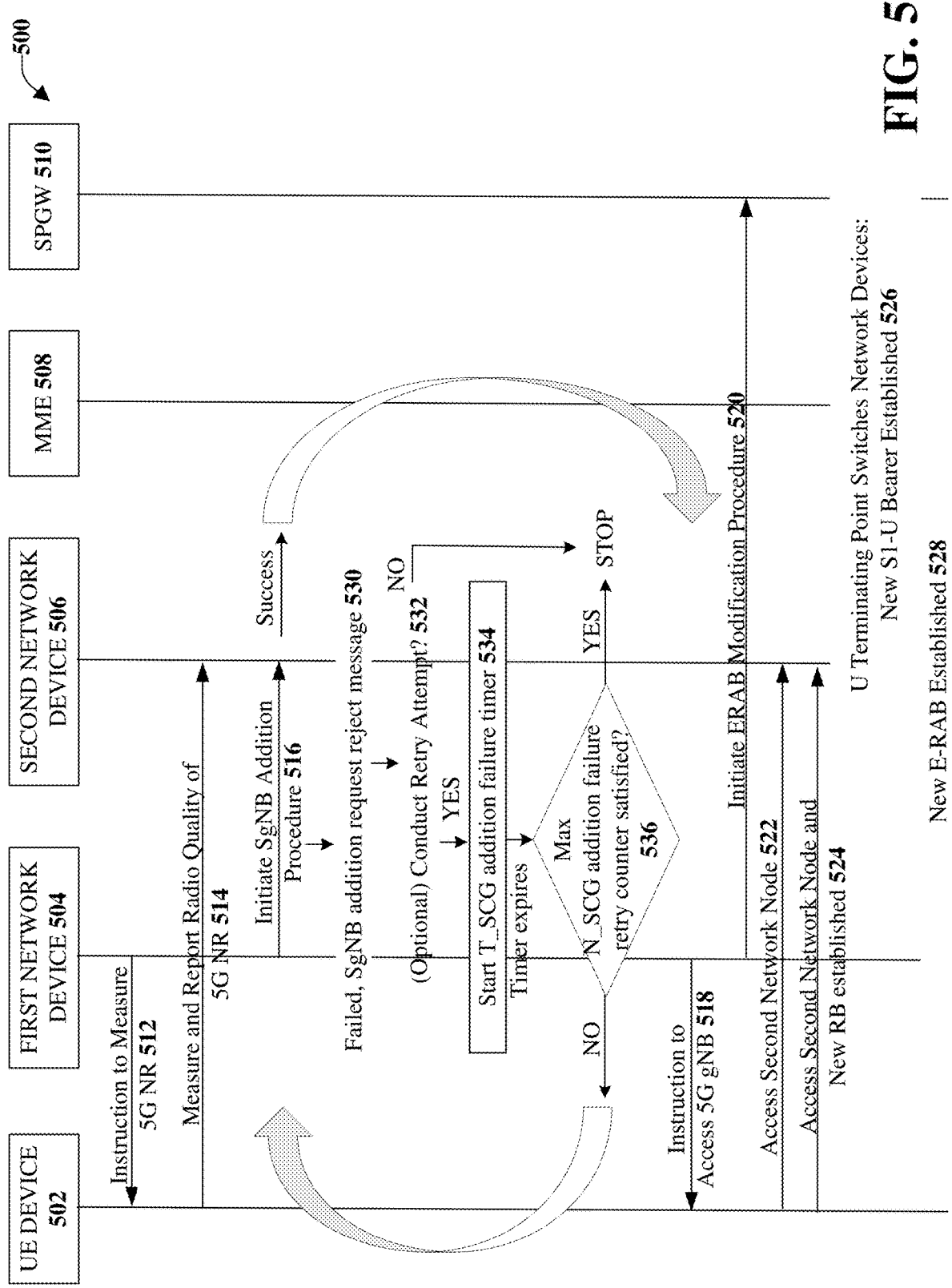
FIG. 5 illustrates a flow diagram of an example, non-limiting, message sequence flow chart for a secondary cell group addition failure retry procedure in accordance with one or more embodiments described herein.

FIG. 5 illustrates a flow diagram of an example, non-limiting, message sequence flow chart 500 for a secondary cell group addition failure retry procedure in accordance with one or more embodiments described herein. Repetitive description of like elements employed in other embodiments described herein is omitted for sake of brevity.

The message sequence flow chart 500 can be utilized for new radio, as discussed herein. It is noted that the message sequence flow chart 500 is for illustration purposes only and sequence timing could be in another order (e.g., the sequence timing illustrated and described might not be in a precise order utilized during implementation).

As illustrated, the message sequence flow chart 500 represents the message sequence between various devices including a User Equipment (UE) device 502, a first network device 504), a second network device 506, a Mobility Management Entity device 508 (e.g., a third network device, and a Service Provider Gateway (SPGW) device 510 (e.g., a fourth network device). According to some implementations, the first network device 504 can be an LTE eNB and the second network device 506 can be a 5G gNB.

The first network device 504 can instruct the UE device 502 to measure the 5G NR signal or radio quality, at 512. The UE device 502 can perform the measurement and, report the radio quality of 5G NR, as indicated at 514. Upon or after receiving the report (and/or measurements), the first network device 504 can initiate a SgNB addition procedure, at 516.

If the SgNB addition procedure is successful, at 518, the first network device 504 can instruct the UE device to access 5G gnB. Further, at 520, the first network device 504 can initiate an ERB modification procedure. Thereafter, the UE device can access the 5G gNB, as indicated at 522. Upon or after the UE device accesses the 5G gNB, a new Radio Bearer (RB) can be established, at 524. Further, at 526, the U terminating point can switch from the first network device

504 to the second network device and a new S1-U bearer can be established. As indicated at 528, a new E-RAB can be established.

Alternatively, if the SgNB addition procedure at 516 was not successful, at 530 an SgNB addition request reject message can be received. It is noted that in the SgNB addition request reject message, the SgNB can indicate a cause value for the failure. According to an implementation, depending upon the cause value, the MeNB can terminate the procedure (e.g. if failure is due to transport network unavailability).

At 532, a determination can be made whether a retry attempt should be made (which can be optional (e.g., some implementations do not make such a determination)). If not, the call flow stops. If a retry attempt should be made, at 534, a T-SCG additional failure timer can be started. If the optional determination is not utilized, the message sequence flow chart 500 can proceed from 530 to 534.

Upon or after expiration of the timer, a determination can be made, at 536, whether a maximum N_SCG additional failure retry time has been exceeded. If yes, the message sequence flow chart 500 can stop. If not exceeded ("NO"), the call flow can return to 516 with another SgNB addition procedure being initiated.

Figure 6:
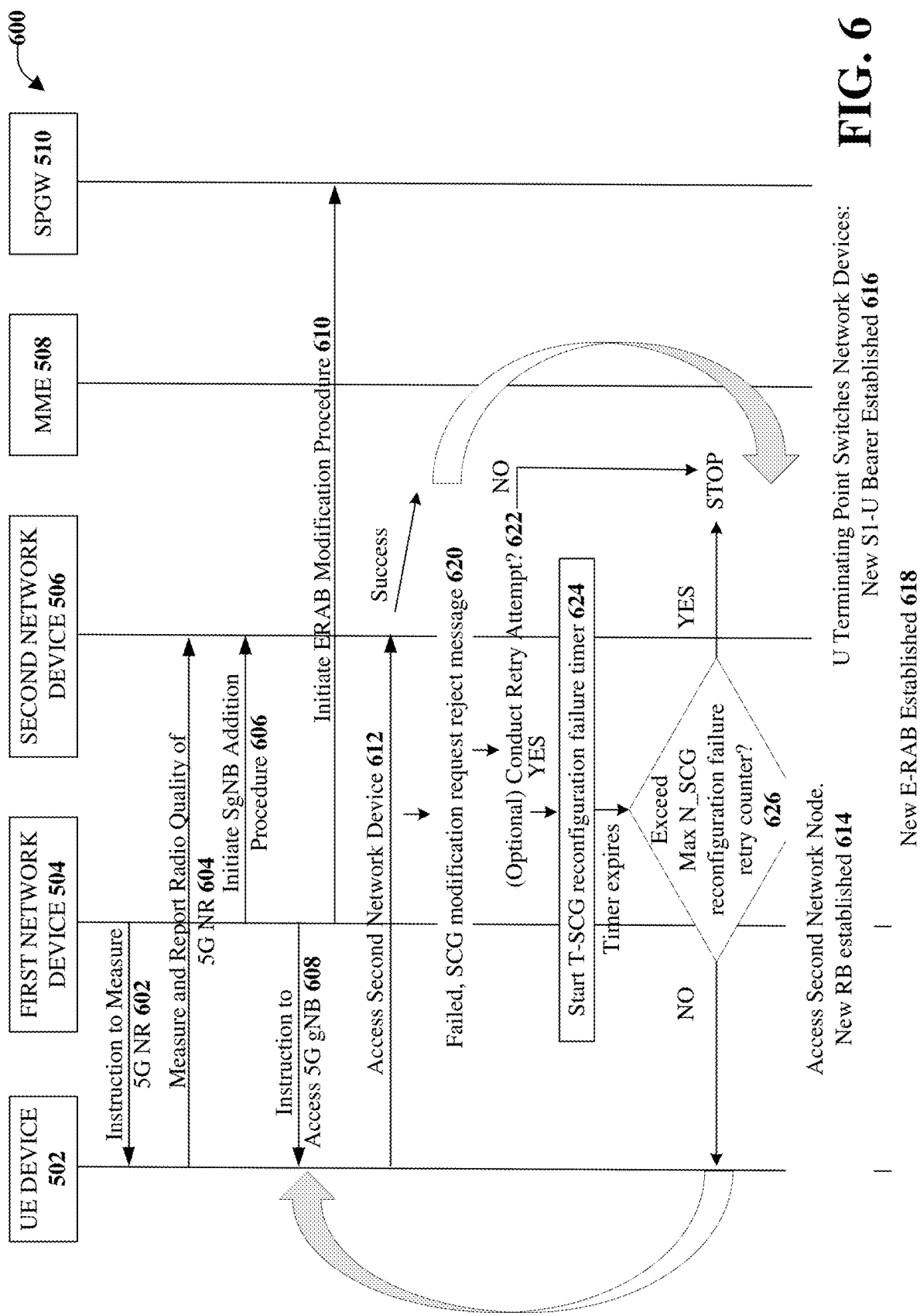
FIG. 6 illustrates a flow diagram of an example, non-limiting, message sequence flow chart for a secondary cell group configuration failure retry procedure in accordance with one or more embodiments described herein.

FIG. 6 illustrates a flow diagram of an example, non-limiting, message sequence flow chart 600 for a secondary cell group configuration failure retry procedure in accordance with one or more embodiments described herein. Repetitive description of like elements employed in other embodiments described herein is omitted for sake of brevity.

The message sequence flow chart 600 can be utilized for new radio, as discussed herein. It is noted that the message sequence flow chart 600 is for illustration purposes only and sequence timing could be in another order (e.g., the sequence timing illustrated and described might not be in a precise order utilized during implementation).

As illustrated, the first network device 504 can instruct the UE device 502 to measure the 5G NR signal or radio quality, at 602. The UE device 502 can perform the measurement and, report the radio quality of 5G NR, as indicated at 604. Upon or after receiving the report (and/or measurements), the first network device 504 can initiate a SgNB addition procedure, at 606.

The first network device 504 can instruct the UE device 502 to access the second network device 506 (e.g., the 5G gNB), at 608. Further, at 610, the first network device 504 can initiate an ERAB modification procedure. As indicated at 612, the UE device 502 can access the second network device.

If the UE device 502 can successfully access the second network device 506, at 614, a new RB can be established. Further, at 616, the U terminating point switches from the first network device 504 to the second network device 506 and a new S1-U bearer can be established. As indicated at 618, a new E-RAB is established.

Alternatively, if the UE device 502 did not successfully access the second network device 506 (failed), at 620, a SCG modification request reject message can be provided. It is noted that in the SgNB modification request reject message, the SgNB can indicate a cause value for the failure. According to an implementation, depending upon the cause value, the MeNB can terminate the procedure (e.g. if failure is due to transport network unavailability).

At 622, a determination can be made whether a retry attempt should be made (which can be optional (e.g., some implementations do not make such a determination)). If not, the call flow stops. If a retry attempt should be made, at 624, a T-SCG reconfiguration failure timer can be started. If the optional determination is not utilized, the message sequence flow chart 600 can proceed from 620 to 624.

Upon or after the timer expires, a determination can be made, at 626 whether the max N-SCG reconfiguration failure retry counter has been exceeded. If so, no more retry attempts should be made and the message sequence flow chart 600 stops. However, if the reconfiguration failure retry counter value has not been exceed, the message sequence flow chart 600 can return to 608 and the first network device 504 can instruct the UE device 502 to access the second network device 506.

Figure 7:
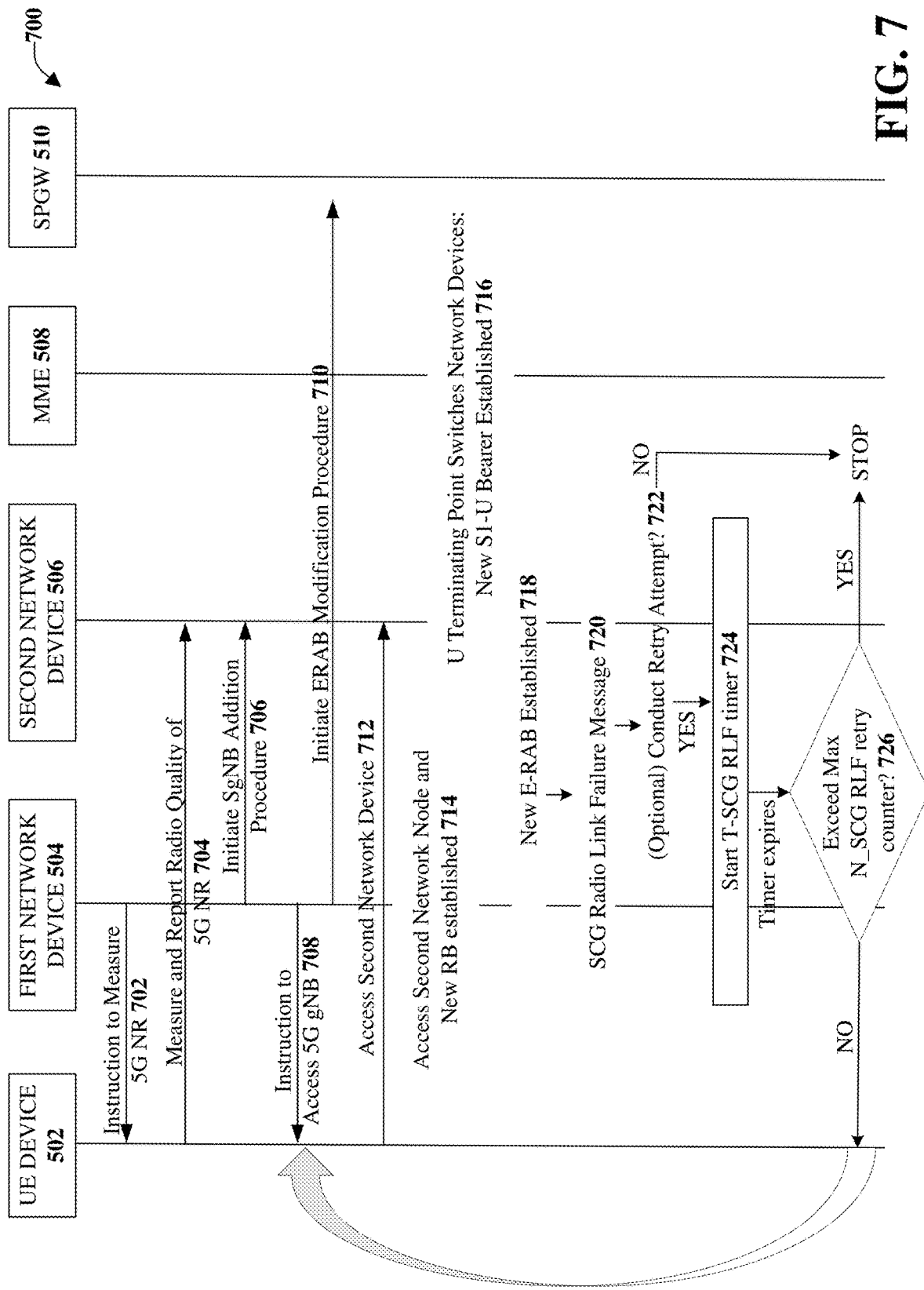
FIG. 7 illustrates a flow diagram of an example, non-limiting, message sequence flow chart for a secondary cell group radio link failure retry procedure in accordance with one or more embodiments described herein.

FIG. 7 illustrates a flow diagram of an example, non-limiting, message sequence flow chart 700 for a secondary cell group radio link failure retry procedure in accordance with one or more embodiments described herein. Repetitive description of like elements employed in other embodiments described herein is omitted for sake of brevity.

The message sequence flow chart 700 can be utilized for new radio, as discussed herein. It is noted that the message sequence flow chart 700 is for illustration purposes only and sequence timing could be in another order (e.g., the sequence timing illustrated and described might not be in a precise order utilized during implementation).

As illustrated, the first network device 504 can instruct the UE device 502 to measure the 5G NR signal or radio quality, at 702. The UE device 502 can perform the measurement and, report the radio quality of 5G NR, as indicated at 704. Upon or after receiving the report (and/or measurements), the first network device 504 can initiate a SgNB addition procedure, at 706.

The first network device 504 can instruct the UE device 502 to access the second network device 506 (e.g., the 5G gNB), at 708. Further, at 710, the first network device 504 can initiate an ERAB modification procedure. As indicated at 712, the UE device 502 can access the second network device. Upon or after accessing the second network device, at 714, a new RB can be established. Further, at 716, the U terminating point switches from the first network device 504 to the second network device 506 and a new S1-U bearer can be established. As indicated at 718, a new E-RAB is established. The message sequence flow chart 700 continues, at 720, when a SCG radio link failure message (e.g., a SCCGFailureInformationNR message) is received.

At 722, a determination can be made whether a retry attempt should be conducted (which can be optional (e.g., some implementations do not make such a determination)). If not ("NO"), the call flow stops. If a retry attempt should be made ("YES), at 724, a T-SCG RLF timer can be started. If the optional determination is not utilized, the message sequence flow chart 700 can proceed from 720 to 724.

Further, upon or after expiration of the timer, a determination can be made, at 726, whether the number of retry attempts has exceeded the maximum N_SCG RLF retry counter. If the number of retry attempts has been exceeded ("YES"), the message sequence flow chart 700 stops. However, if the number of retry attempts has not been met or exceeded ("NO"), the message sequence flow chart 700 can return to 708 when the first network device 504 instructs the UE device 502 to access the second network device 506.

FIG. 8A illustrates a first table 802 for the implementation of timers and FIG. 8B illustrates a second table 804 for the implementation of counters in a standards document in accordance with one or more embodiments described herein. As discussed, the naming convention provided and illustrated in FIG. 8A and FIG. 8B are for example purposes only and other naming conventions can be utilized with the disclosed aspects.

For the first table 802, sample timer names 806 are provided. Also provided are a trigger 808 (e.g., start) for each timer and a determination of when the timer is to stop 810. Further, instructions as to what is to occur at expiration of the timer (812) are provided.

For the second table, sample counter names 814 are provided. Also provided are reset conditions 816 for each timer and instructions for when each timer is incremented 818. Further, instructions as to what is to occur when the maximum value of each timer is reached is also provided, at 820.

As discussed herein, provided is the addition of one or more timers and/or one or more retry counters in various failure scenarios including, for example, SCG addition failure, SCG RLF, and SCG reconfiguration failure. The network device(s) can utilize the one or more timers and/or the one or more retry counters to optimize the management of handling SCG failures.

Described herein are systems, methods, articles of manufacture, and other embodiments or implementations that can facilitate management of secondary cell group failures in advanced networks. Facilitating management of secondary cell group failures can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (e.g., cars, airplanes, boats, space rockets, and/or other at least partially automated vehicles (e.g., drones), and so on). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

To meet the huge demand for data centric applications, 4G standards can be applied to 5G, also called New Radio (NR) access. The 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a ($N_t$, $N_r$) system, where $N_t$ denotes the number of transmit antennas and Nr denotes the receive antennas, the peak data rate multiplies with a factor of $N_t$ over single antenna systems in rich scattering environment.

In addition, advanced networks, such as a 5G network can be configured to provide more bandwidth than the bandwidth available in other networks (e.g., 4G network, 5G network). A 5G network can be configured to provide more ubiquitous connectivity. In addition, more potential of applications and services, such as connected infrastructure, wearable computers, autonomous driving, seamless virtual and augmented reality, "ultra-high-fidelity" virtual reality, and so on, can be provided with 5G networks. Such applications and/or services can consume a large amount of bandwidth. For example, some applications and/or services can consume about fifty times the bandwidth of a high-definition video stream, Internet of Everything (IoE), and others. Further, various applications can have different network performance requirements (e.g., latency requirements and so on).

Cloud Radio Access Networks (cRAN) can enable the implementation of concepts such as SDN and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 9:
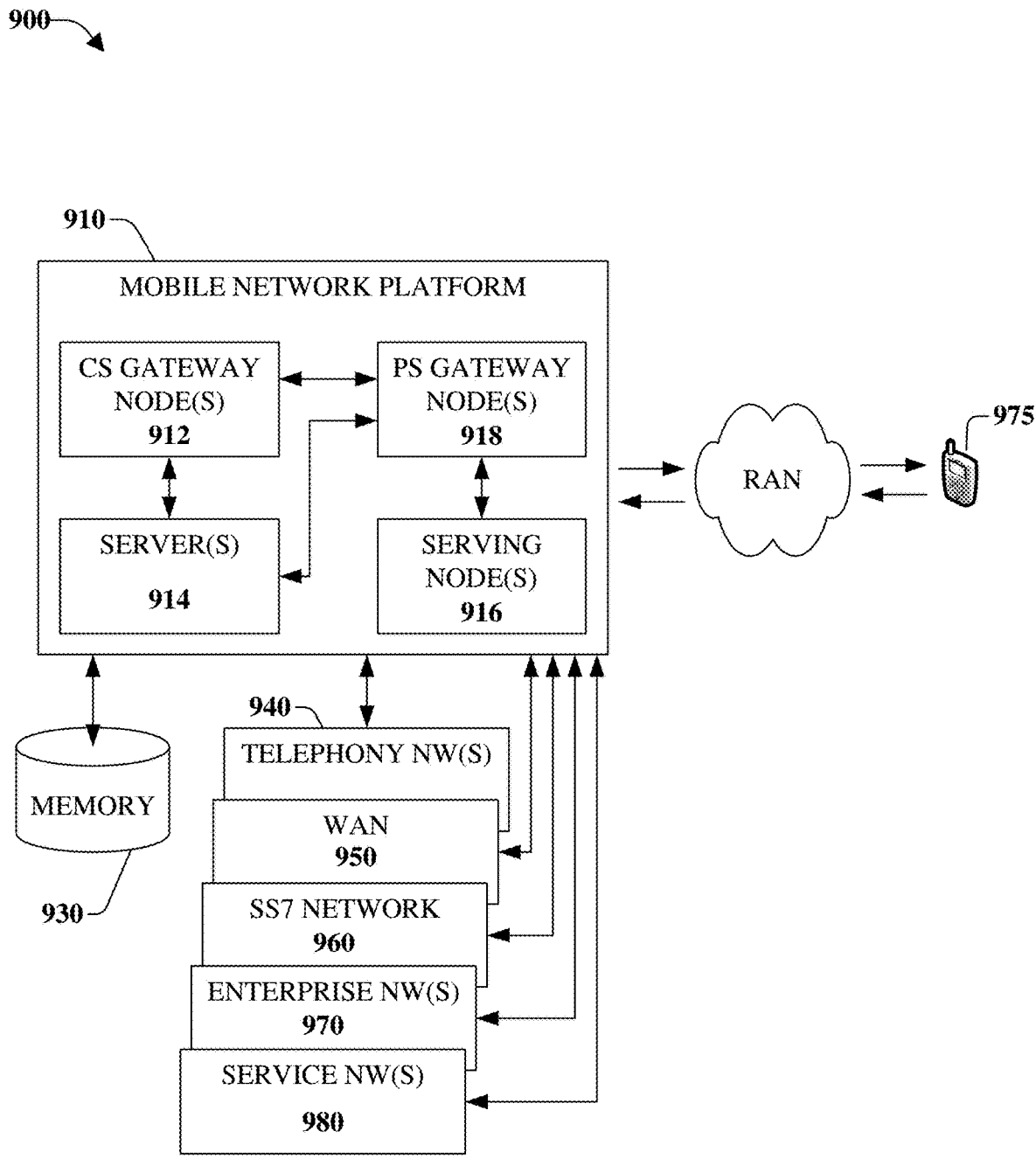
FIG. 9 illustrates an example block diagram of a non-limiting embodiment of a mobile network platform in accordance with various aspects described herein.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks such as telephony network(s) 940 (e.g., public switched telephone network (PSTN), or public land mobile network (PLMN)) or a signaling system #7 (SS7) network 960. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, and PGWs disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) such as IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless network platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
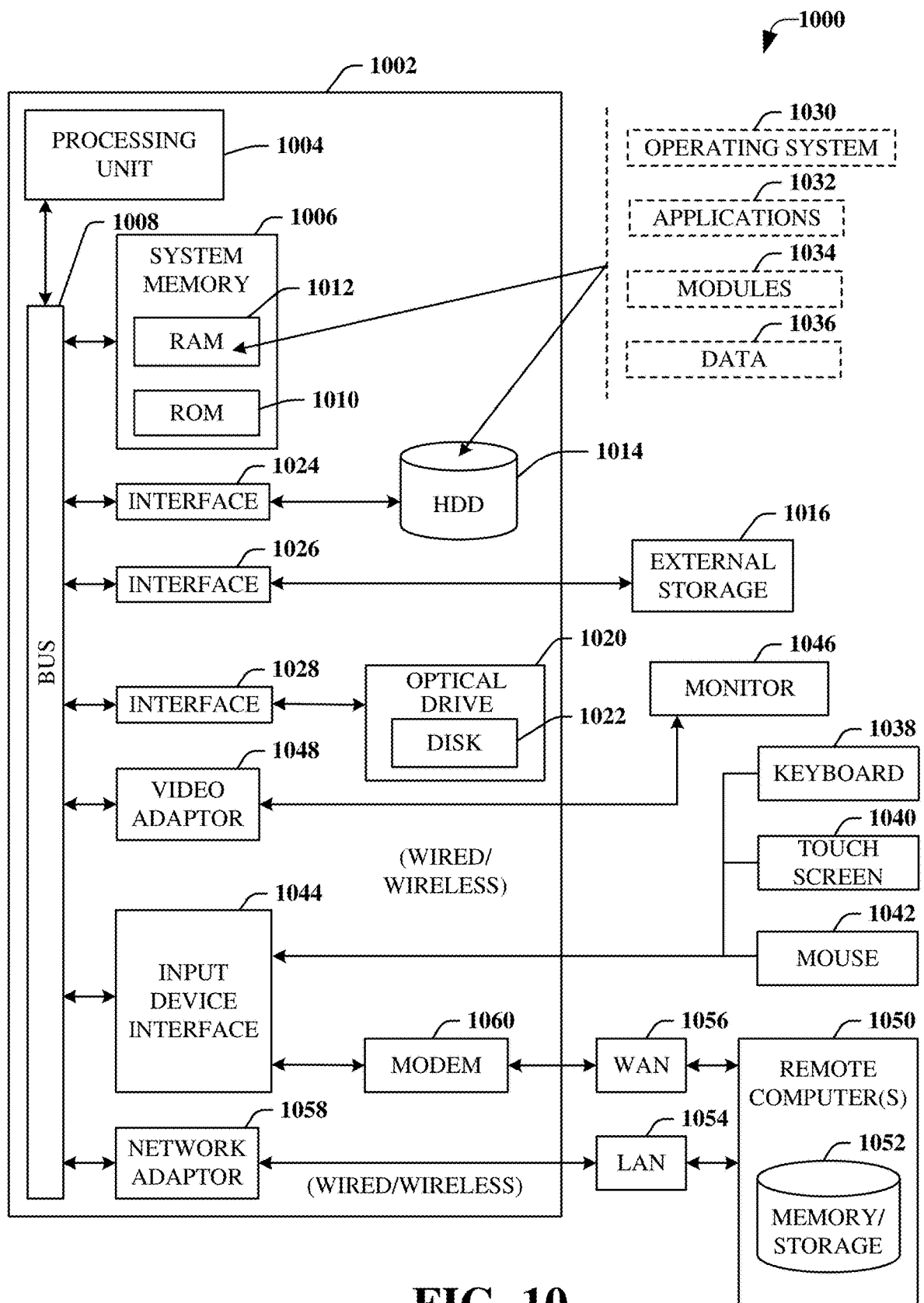
FIG. 10 illustrates an example block diagram of an example computer operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device, comprising:
   a processor; and
   a memory that stores executable instructions that, when executed by the processor, facilitate performance of operations, comprising:
   based on a detection of a secondary cell group failure message received in response to a first secondary cell group function, initiating, for a first time, a delay timer that facilitates a defined period of time between initiation of respective retry attempts of a group of retry attempts, wherein the defined period of time is implemented to facilitate removal of a beam blockage in a millimeter wave spectrum;
   determining whether a retry attempt threshold level associated with the group of retry attempts has been satisfied; and
   based on an expiration of the delay timer and based on the determining indicating that the retry attempt threshold level has not been satisfied, performing a second secondary cell group function and initiating, for a second time, the delay timer.

2. The device of claim 1, wherein the first secondary cell group function and the second secondary cell group function are secondary cell group addition functions.

3. The device of claim 2, wherein the delay timer is a secondary cell group addition failure timer, and wherein the determining is based on a value associated with a defined secondary cell group addition failure retry counter.

4. The device of claim 1, wherein the first secondary cell group function and the second secondary cell group function are secondary cell group reconfiguration functions.

5. The device of claim 4, wherein the delay timer is a secondary cell group reconfiguration failure timer, and wherein the determining is based on a value associated with a defined secondary cell group reconfiguration failure retry counter.

6. The device of claim 1, wherein the first secondary cell group function and the second secondary cell group function are secondary cell group radio link functions.

7. The device of claim 6, wherein the delay timer is a secondary cell group radio link failure timer, and wherein the determining is based on a value associated with a defined secondary cell group radio link failure retry counter.

8. The device of claim 1, wherein the operations further comprise:
   prior to the initiating, for the first time, the delay timer, determining whether attempts for subsequent secondary cell group functions are to be attempted based on receipt of the secondary cell group failure message.

9. The device of claim 1, wherein the operations further comprise:
   terminating subsequent retry attempts based on the determining indicating that the retry attempt threshold level has been satisfied.

10. The device of claim 1, wherein the device is deployed in a non-standalone deployment architecture.

11. The device of claim 1, wherein the device is deployed in a standalone deployment architecture.

12. A method, comprising:
   determining, by a system comprising a processor, that a first secondary cell group procedure attempt is unsuccessful based on blockage of a beam in a millimeter wave spectrum; and
   facilitating, by the system, a second secondary cell group procedure attempt based on expiration of a delay timer and based on a determination that a retry attempt threshold level is not exceeded, wherein the facilitating comprises waiting for respective expirations of the delay timer between respective retry attempts of a group of retry attempts, and wherein the respective expirations are based on a defined time that allows for removal of the blockage of the beam in the millimeter wave spectrum.

13. The method of claim 12, wherein the determination is a first determination, wherein the delay timer is a first delay timer, wherein the expiration is a first expiration, and wherein the method further comprises:
  determining, by the system, that the second secondary cell group procedure attempt is unsuccessful; and
  facilitating, by the system, a third secondary cell group procedure attempt based on a second expiration of a second delay timer and based on a second determination that the retry attempt threshold level is not exceeded.

14. The method of claim 12, wherein the first secondary cell group procedure attempt and the second secondary cell group procedure attempt are secondary cell group addition procedures.

15. The method of claim 12, wherein the first secondary cell group procedure attempt and the second secondary cell group procedure attempt are secondary cell group reconfiguration procedures.

16. The method of claim 12, wherein the first secondary cell group procedure attempt and the second secondary cell group procedure attempt are secondary cell group radio link procedures initiated based on a failure of a new radio coverage for a user equipment.

17. A non-transitory machine-readable medium, comprising executable instructions that, when executed by a processor, facilitate performance of operations, comprising:
  determining, based on detection of a failure of a first secondary cell group procedure, that a second secondary cell group procedure is to be attempted;
  determining whether a number of attempts that have already been performed during the first secondary cell group procedure is less than a defined number of attempts;
  determining an expiration of a first delay timer, wherein the first delay timer is initiated based on the detection of the failure and implements a first delay; and
  attempting the second secondary cell group procedure based on the expiration of the first delay timer and based on the determining indicating that the number of attempts is less than the defined number of attempts, wherein the attempting comprises initiating a second delay timer, wherein the second delay timer implements respective second delays of a defined period between respective attempts, and wherein the first delay and the second delay facilitate respective times for removal of a blockage caused to a beam of a millimeter wave spectrum.

18. The non-transitory machine-readable medium of claim 17, wherein the first secondary cell group procedure and the second secondary cell group procedure are secondary cell group addition procedures, wherein the first delay timer and the second delay timer are secondary cell group addition failure timers, and wherein the determining of the number of attempts is less than the defined number of attempts is based on a defined secondary cell group addition failure retry counter.

19. The non-transitory machine-readable medium of claim 17, wherein the first secondary cell group procedure and the second secondary cell group procedure are secondary cell group reconfiguration procedures, wherein the first delay timer and the second delay timer are secondary cell group reconfiguration failure timers, and wherein the determining of the number of attempts is less than the defined number of attempts is based on a defined secondary cell group reconfiguration failure retry counter.

20. The non-transitory machine-readable medium of claim 17, wherein the first secondary cell group procedure and the second secondary cell group procedure are secondary cell group radio link procedures, wherein the first delay timer and the second delay timer are secondary cell group radio link failure timers, and wherein the determining the number of attempts is less than the defined number of attempts is based on a defined secondary cell group radio link failure retry counter.

* * * * *